(12) United States Patent
Sindano et al.

(10) Patent No.: US 8,578,705 B2
(45) Date of Patent: Nov. 12, 2013

(54) CONTROL OF SELECTIVE CATALYTIC REDUCTION

(75) Inventors: Hector Sindano, West Sussex (GB); Ben Rogers, West Sussex (GB); Andy Noble, West Sussex (GB); Matthew Keenan, West Sussex (GB); Phil Mortimer, West Sussex (GB)

(73) Assignee: Ricardo UK Limited, West Sussex (GB)

( * ) Notice: Subject to any disclaimer, the term of this patent is extended or adjusted under 35 U.S.C. 154(b) by 704 days.

(21) Appl. No.: 12/374,150

(22) PCT Filed: Jul. 18, 2007

(86) PCT No.: PCT/GB2007/002730
§ 371 (c)(1),
(2), (4) Date: Aug. 18, 2009

(87) PCT Pub. No.: WO2008/009940
PCT Pub. Date: Jan. 24, 2008

(65) Prior Publication Data
US 2009/0301066 A1    Dec. 10, 2009

(30) Foreign Application Priority Data
Jul. 20, 2006    (GB) .................................. 0614445.5

(51) Int. Cl.
*F01N 3/20*    (2006.01)
(52) U.S. Cl.
USPC .............................................. 60/295; 60/301

(58) Field of Classification Search
USPC .................................... 60/286, 295, 301, 303
See application file for complete search history.

(56) References Cited

U.S. PATENT DOCUMENTS

| | | | |
|---|---|---|---|
| 6,455,009 B1 * | 9/2002 | Kato et al. | 422/110 |
| 6,959,540 B2 | 11/2005 | Itoh et al. | |
| 2003/0036841 A1 | 2/2003 | Xu et al. | |
| 2004/0098968 A1 * | 5/2004 | van Nieuwstadt et al. | 60/277 |
| 2005/0034450 A1 | 2/2005 | Itoh et al. | |
| 2005/0282285 A1 | 12/2005 | Radhamohan et al. | |

FOREIGN PATENT DOCUMENTS

| | | |
|---|---|---|
| DE | 10043798 A1 * | 3/2002 |
| WO | 2004/113691 A | 12/2004 |

OTHER PUBLICATIONS

International Search Report from PCT/GB2007/002730 dated Feb. 21, 2008 (4 pages).
Written Opinion from PCT/GB2007/002730 dated Feb. 21, 2008 (9 pages).

* cited by examiner

*Primary Examiner* — Kenneth Bomberg
*Assistant Examiner* — Jonathan Matthias
(74) *Attorney, Agent, or Firm* — Osha Liang LLP

(57) ABSTRACT

A method of controlling a rate of introduction of a $NO_x$ reducing substance or precursor to a catalyst component. The method comprises obtaining the amount of $NO_x$ entering the catalyst component, modeling the amount of $NO_x$ reducing substance or precursor in the catalyst component and controlling the rate of introduction of the $NO_x$ reducing substance or precursor to reduce $NO_x$.

18 Claims, 8 Drawing Sheets

CONTROL OF SELECTIVE CATALYTIC REDUCTION

The present invention relates to reduction of oxides of nitrogen (collectively known as $NO_x$) in vehicle exhaust gases and in particular to controlling the reduction of $NO_x$ in such a way that exhaust emissions of ammonia ($NH_3$) as well as $NO_x$ are minimised.

It has been known for many years that $NO_x$ present in vehicle exhaust gases is harmful to the environment and to people's health. There have been increasing moves in recent years to try and encourage reduction of harmful vehicle emissions and various limits have been set on the maximum acceptable level of pollutants such as $NO_x$ which may be emitted by a vehicle. Additionally, consumers are increasingly likely to take environmental factors into account when considering purchasing vehicles. Accordingly, it is desirable to try and limit the amount of $NO_x$ allowed to escape into the atmosphere from vehicle exhausts.

Conventional methods for reducing $NO_x$ emission usually involve exhaust gas recirculation (EGR). However this recycling of exhaust gases has several drawbacks. These include reduced engine performance, particularly at high loads, and an increase in problematic particulates. Furthermore, there is a limit to the level of $NO_x$ emission reduction possible with this technique.

In the next few years new legislation on vehicle emissions will come into force in various countries throughout the world that will drastically decrease the levels of $NO_x$ emissions allowed. The limited effectiveness of EGR methods will then become critical as these methods simply will not be able to meet the stringent $NO_x$ emissions limits.

An alternative technique to EGR has been developed which improves the level of $NO_x$ reduction possible. This is a urea based selective catalytic reduction (SCR). In internal combustion engines that run with a predominantly lean fuel/air mixture, such as direct injection gasoline or diesel engines, SCR is one of the most effective methods for reducing $NO_x$ emissions in the exhaust gas.

The catalyst used in SCR is placed in a vehicle exhaust pipe in such a way that all exhaust gases from the engine pass through the catalyst. An aqueous urea solution is injected in the exhaust gas upstream of the SCR catalyst. The high temperature in the exhaust stream raises the temperature of the catalyst and causes the urea to hydrolyse to ammonia ($NH_3$), via ammonia related compounds, which reduces $NO_x$ in the catalyst to produce harmless products.

To maximise the $NO_x$ emissions eliminated in this way, it must be ensured that enough ammonia is available to react with all the $NO_x$. Too little ammonia will result in high $NO_x$ emissions at the exhaust, but conversely, too much ammonia will result in ammonia emission in the exhaust (a phenomenon referred to as ammonia slip). Emission of ammonia also causes pollution problems and so is also undesirable. Therefore in an ideal SCR system, the amount of $NH_3$ made available to react with the $NO_x$ is exactly the amount necessary to react fully with the available $NO_x$ without leaving any $NH_3$ to be emitted into the atmosphere.

The amount of $NH_3$ available to react with $NO_x$ in the catalyst depends on various factors. Depending on conditions in the catalyst, urea may directly decompose in the catalyst to give ammonia or alternatively urea or other $NH_3$ related compounds may be stored in the catalyst and will then decompose at a later time. The storage of urea and other ammonia related compounds in the catalyst and the rate of breakdown of urea and ammonia related compounds into ammonia in the catalyst depend on the temperature in the catalyst and on how much urea is already stored in the catalyst. An optimum urea injection rate must take account of these different factors.

Originally SCR was used in steady state systems such as power stations, where it is relatively straightforward to determine the amount of ammonia available for reaction and the urea injection rate needed to obtain this amount of ammonia. Therefore minimising the emission of both $NO_x$ and $NH_3$ is not too problematic for such systems. However in dynamic vehicle engine systems with fluctuating temperatures, determining the amount of ammonia available is complicated. As more $NH_3$ is released as catalyst temperature rises and more of the $NH_3$ related compounds are stored within the catalyst as catalyst temperature falls, the storage and release of ammonia in the catalyst continuously varies as catalyst temperature fluctuates. It is therefore difficult to achieve the constantly changing appropriate urea injection rate to optimise the performance of vehicle SCR catalysts.

Current SCR methods for reducing pollution from vehicles tend to take the approach of concentrating only on minimising $NO_x$ emission, by attempting to vary the urea injection rate such to ensure that there is always at least enough ammonia available to react with all the $NO_x$. A certain amount of ammonia slip is considered to be acceptable.

An example of such a system is described in U.S. Pat. No. 6,959,540. This publication discloses an SCR system wherein exhaust temperature is measured. When this temperature is in a range where urea is stored by the catalyst, the urea injection rate is increased so that urea is stored in preparation for when a load on the engine increases $NO_x$ emission and therefore catalyst temperature. This aims to provide quicker ammonia production on, for example, vehicle acceleration than would be the case if the urea injection rate was simply increased when the acceleration started.

This system has several shortcomings. Firstly, only the exhaust temperature is measured and this is not related to the actual catalyst temperature, which is the relevant variable. Secondly, the system only changes the urea injection rate based on large scale changes in temperature ranges and does not take into account more detailed variation in temperatures, such as transient fluctuations occurring, for example, at the moment a pedal is depressed. This means that it would never be possible to accurately match the ammonia produced to the $NO_x$ produced as it is never possible to accurately know the rate of engine $NO_x$ emission. Thirdly, the system does not take into account a quantitative measure of urea storage and ammonia release by the catalyst. Fourthly, there is no consideration of the rate of ammonia production beyond attempting to provide an excess of stored urea at low temperatures, leading to a risk of ammonia slip. In particular, because it relies on a simple open loop look-up table based approach, the disclosed system is inaccurate and inefficient which leads to insufficient ammonia production and therefore $NO_x$ emission from the exhaust in some conditions and over-production of ammonia and associated ammonia slip in other conditions.

A further problem with known systems is the inability of $NO_x$ sensors to distinguish $NO_x$ and $NH_3$.

The present invention is set out in the claims.

Examples of the present invention will now be described with reference to the accompanying drawings, in which.

The present invention relates to a method and system for controlling an SCR system to minimise the level of harmful pollutants, that is both $NO_x$ and ammonia ($NH_3$), that a vehicle containing an SCR catalyst emits into the atmosphere.

Figure 1:
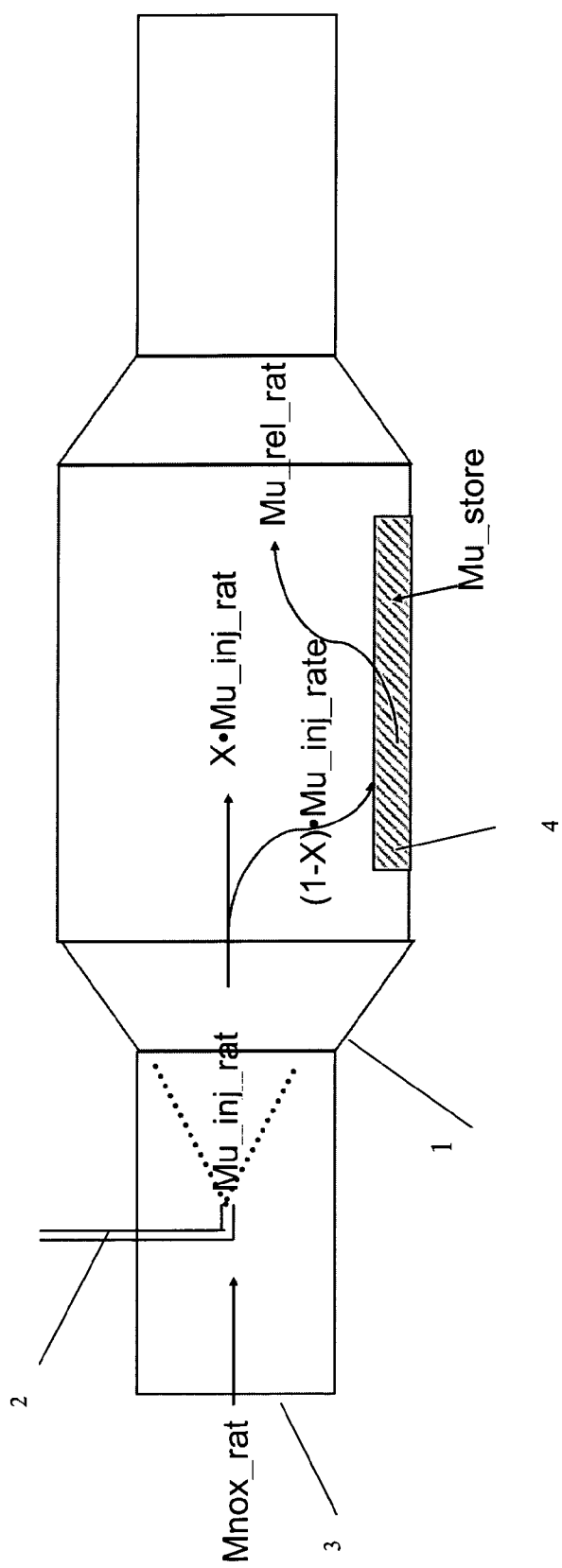
FIG. 1 is a diagram showing the different mass rates occurring in different parts of an SCR catalyst.

A schematic diagram of an SCR catalyst system is shown in FIG. 1, together with the different component mass rates in different parts of the catalyst 1, which are discussed in more detail below. The system comprises a catalyst 1 which is placed, for example, in vehicle exhaust system 5 (see FIG. 3), in a position which maximises the amount of $NO_x$ emitted from the engine 6 that flows through the catalyst 1. A liquid injector (not shown) is arranged such that liquid can be injected upstream of the catalyst 1. A controller (not shown) is connected to the liquid injector to control the rate of liquid injection.

In operation, a liquid containing an ammonia generating compound is injected at upstream of the catalyst. This is usually an aqueous urea solution but may be any other suitable liquid. $NO_x$ enters the catalyst as shown at 3.

The injected urea may immediately break down to give ammonia, which may be produced via intermediate ammonia related compounds such as biuret. Alternatively, urea or intermediate ammonia related compounds (together termed "ammonia related compounds") may firstly be stored 4 in the catalyst, breaking down to give ammonia at a later time, the respective breakdown/storage rates being temperature dependent. The ammonia reacts with the $NO_x$ at the catalyst in a redox reaction to give harmless products which are then emitted from the exhaust. For example $2NH_3+NO+NO_2 \rightarrow 2N_2+3H_2O$.

Figure 2A:
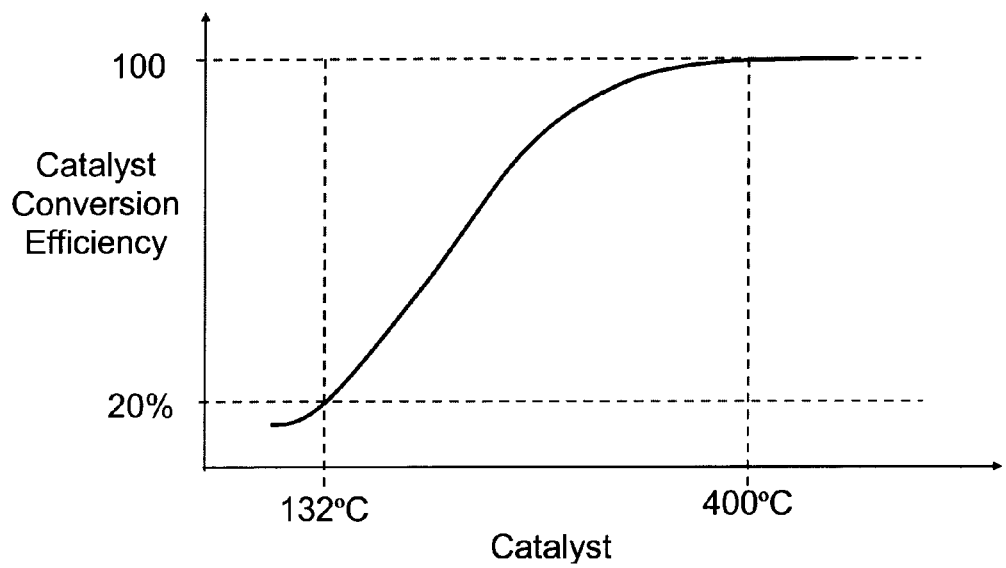
FIG. 2a is a graph showing how the catalyst conversion efficiency varies with temperature.
Figure 2B:
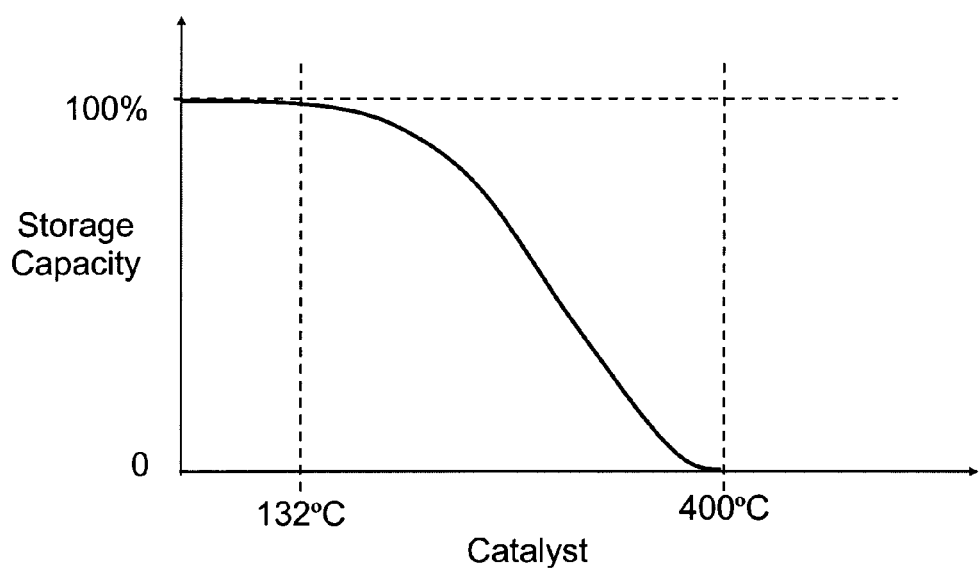
FIG. 2b is a graph showing how storage capacity for ammonia related compounds (including urea and intermediate ammonia related compounds) of the catalyst varies with temperature.

The efficiency of $NO_x$ reduction (conversion efficiency) in the catalyst 1 is linked to the rate of production of ammonia in the catalyst from the breakdown of ammonia related compounds. As shown in FIG. 2a, below 132° C. almost no ammonia is produced, dependent on the catalyst/SCR temperature. Above 132° C. the conversion efficiency starts to increase in proportion to temperature. Above about 400° C. all injected urea immediately decomposes into ammonia. The catalyst 1 stores any surplus ammonia related compounds not used in converting $NO_x$. Hence, as shown in FIG. 2b, the catalyst 1 stores virtually all the injected urea (up to a physical maximum) below 132° C. and above 400° C. all injected urea immediately decomposes into $NH_3$. In between these two temperatures, a mixture of ammonia related compounds is stored, with the particular intermediate ammonia related compounds stored and the overall composition of the mixture, including proportion of urea, varying with varying temperature.

In the dynamic system of a vehicle engine 6, the temperature of the catalyst 1 is constantly changing, with many transient temperature fluctuations occurring due to actions such as braking or accelerating of the vehicle.

Figure 3:
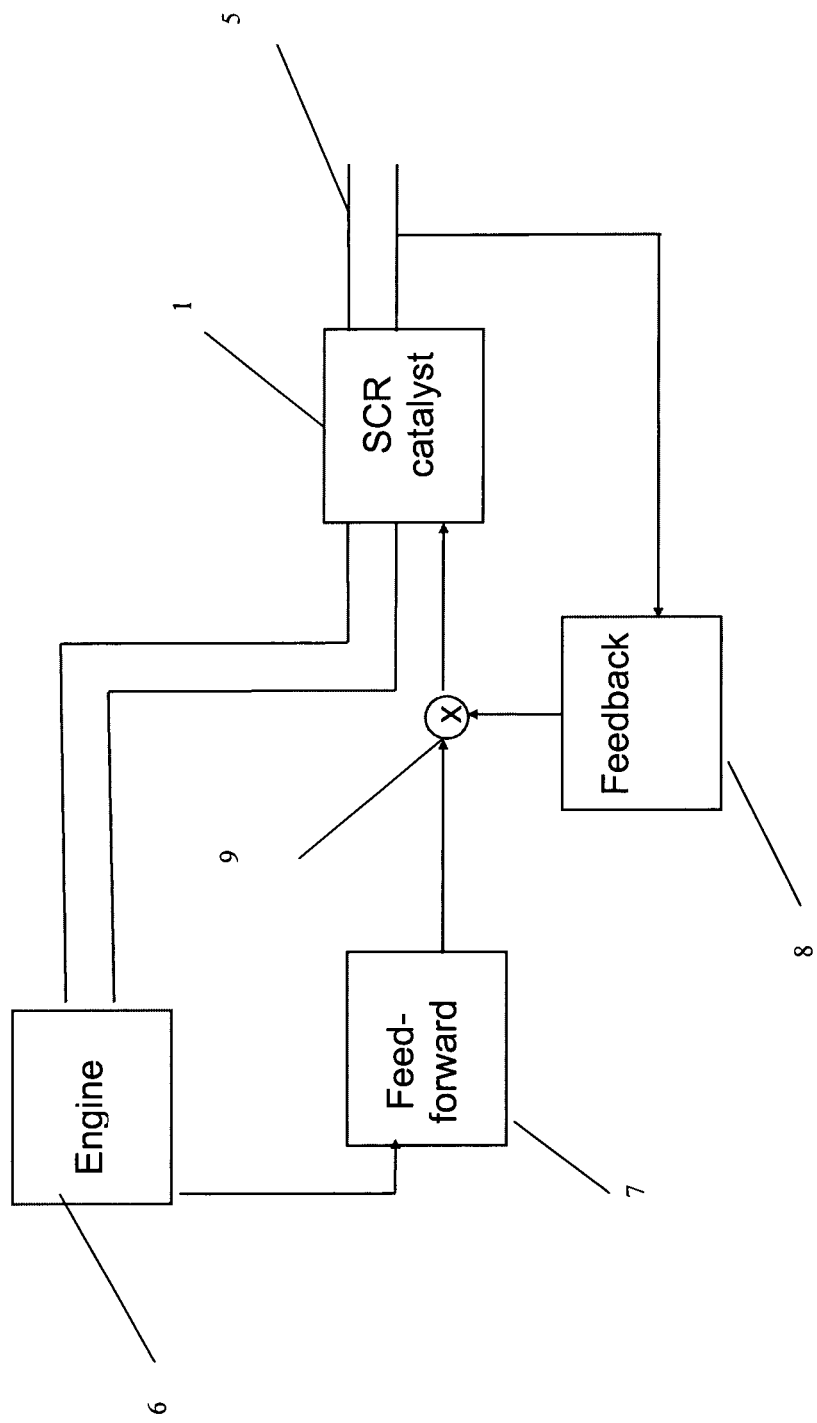
FIG. 3 is a conceptual diagram showing the effect of transient engine operation.

In overview, as shown in FIG. 3, the control system of the present invention comprises a feed-forward mechanism 7 with variables related to engine 6 performance as inputs. This controls the rate of urea injection 2 at the catalyst and possibly also the emission $NO_x$ rate from the engine 6. A feedback mechanism 8 may output a correction to the urea injection rate predicted by the feed-forward mechanism, the feedback correction occurring at point 9.

The system of the present invention makes use of a model which takes into account the differing rates of both ammonia related compound storage and ammonia release and how these depend on catalyst temperature to determine the amount of $NH_3$ available to react with $NO_x$ at any particular point in time. This enables the optimum urea injection rate for a desired rate of reduction of $NO_x$ to be determined. The present invention uses a feed-forward approach incorporating this model to continually optimise the urea injection rate for the SCR catalyst 1 so that the amount of ammonia available can always be matched to the amount of $NO_x$ needing to be reduced. Various forms of feedback may also be used to correct any errors in the feed-forward model. The details of the model used are discussed below.

Turning first to the feed-forward model and referring again to FIG. 1, the amount of urea available to reduce $NO_x$ is the sum of injected urea that immediately decomposes into $NH_3$ and the ammonia related compounds released by the catalyst 1:

$$\text{Mu\_avail} = X \cdot \text{Mu\_inj\_rate} + \text{Mu\_rel\_rate} \quad [1]$$

where Mu_avail=mass rate of urea made available to reduce $NO_x$

X=fraction of injected urea that immediately decomposes into $NH_3$

Mu_inj_rate=mass rate of injection of urea

Mu_rel_rate=mass rate of release of ammonia related compounds from catalyst

The assumption is made that the rate of release of ammonia related compounds from the catalyst 1 at a given catalyst temperature is proportional to the "State of Fill" of the catalyst:

$$\text{Mu\_rel\_rate} = \text{Mu\_stored}/\text{Tau\_rel} \quad [2]$$

where Mu_stored=mass of ammonia related compounds stored in the catalyst ("State of Fill")

Tau_rel=time constant for the rate release of ammonia related compounds from the catalyst, which is a function of catalyst temperature Combining equation [1] and equation [2] gives the urea injection rate as:

$$\text{Mu\_inj\_rate} = (\text{Mu\_avail} - \text{Mu\_stored}/\text{Tau\_rel})/X \quad [3]$$

Figure 4:
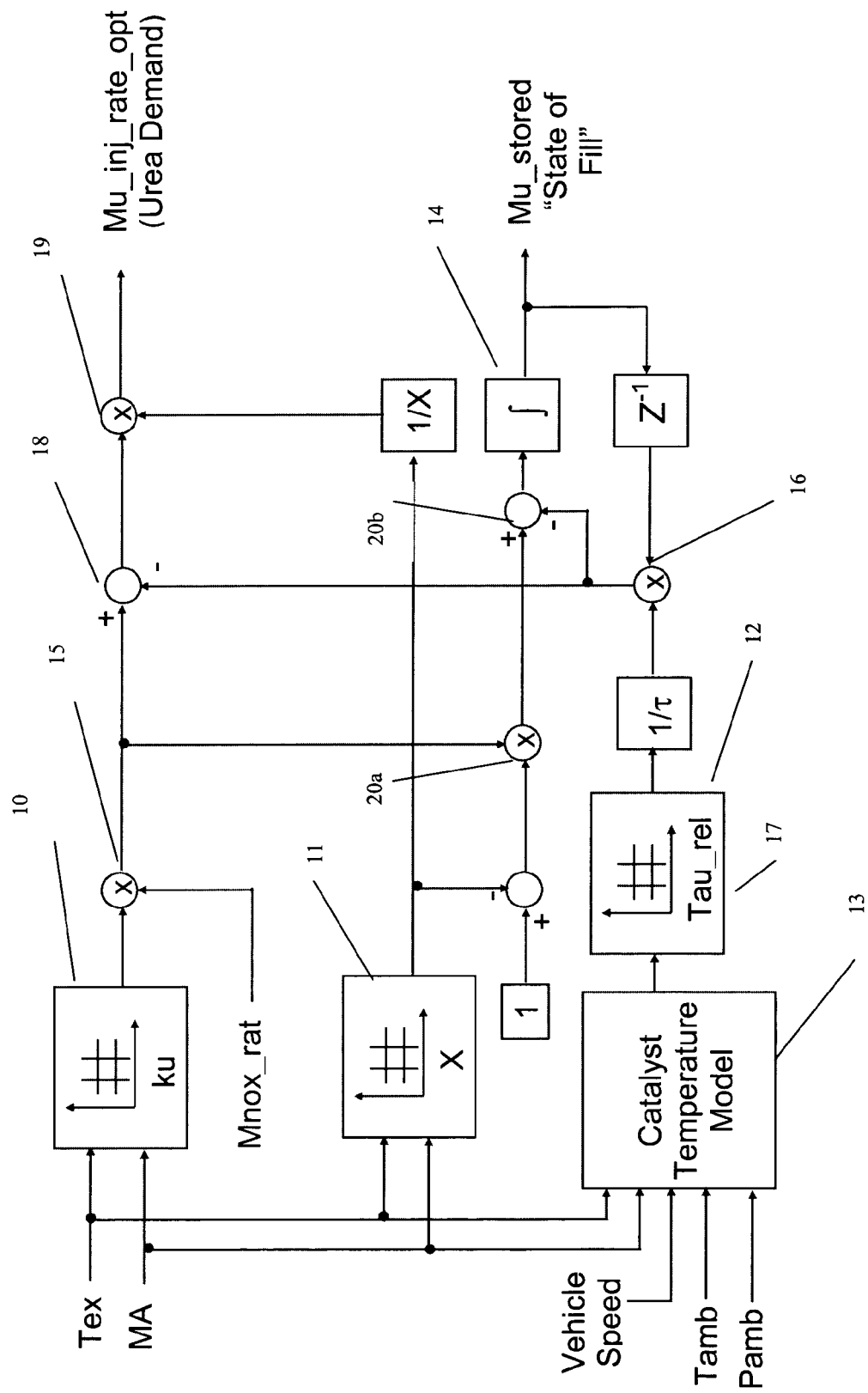
FIG. 4 is diagrammatic overview of the feed-forward strategy of the present invention.

The optimal urea injection rate is obtained when it results in Mu_avail just sufficient to reduce all the available $NO_x$:

$$\text{Mu\_inj\_rate\_opt} = (ku \cdot \text{Mnox\_rate} - \text{Mu\_stored}/\text{Tau\_rel})/X \quad [4]$$

where Mu_inj_rate_opt=optimal urea mass rate of injection ku=a scaling factor which accounts for conversion from $NO_x$ to urea, including both decomposition of urea to $NH_3$ and stoichiometric considerations for reduction of $NO_x$ by $NH_3$ Mnox_rate=engine-out $NO_x$ emission mass flow rate FIG. 4 shows how equation [4] is used in the feed-forward strategy of the present invention. To obtain the first factor, Mnox_rate is obtained from a sensor or modelled as discussed in detail below. "ku" and "X" are obtained from look-up tables 10, 11. These can be dependent on the exhaust 5 temperature, $T_{ex}$, and mass air flow rate, MAF. To obtain the second factor, Mu_stored or "state of fill" is obtained by integration as described in more detail below. Tau_rel is calculated 12 from a model 13 of catalyst temperature. This model relates catalyst 1 temperature to the vehicle exhaust 5 temperature, $T_{exh}$, the ambient temperature, $T_{amb}$ and pressure, $P_{amb}$ and vehicle speed. $T_{exh}$ is either measured with a temperature sensor or obtained from a look-up table based on engine speed and load. The basis of the model of catalyst temperature is as follows:

Catalyst gains heat from exhaust gas mainly by convection:

$$\text{Heat Gain} = \text{Convection} * \text{MAF} * (T_{exh} - T_{cat})$$

where MAF=mass air flow $T_{cat}$=catalyst temperature

Heat is lost from catalyst to the surroundings by a combination of convection and conduction:

$$\text{Heat Loss} = (\text{Conduction} + (\text{Ambient airflow} * \text{Convection})) * (T_{cat} - T_{amb})$$

$$\text{Ambient airflow} = \text{Vehicle\_speed} * P_{amb} / T_{amb}$$

where $T_{amb}$=ambient air temperature $P_{amb}$=ambient air pressure

Catalyst temperature is obtained by integrating the difference between heat gained and heat lost:

$$T_{cat} = T_{cat} + (\text{Heat Gain} - \text{Heat Loss}) / \text{Heat Capacity}$$

The mass of ammonia related compounds, Mu_stored, stored in the SCR catalyst is the difference between that added from the current injection of urea, and that released from previously stored amount of ammonia related compounds. This thus gives the equation for the rate of change of ammonia related compounds stored in the catalyst as:

Δ(stored ammonia related compounds)=ammonia related compounds added to storage−ammonia related compounds released from storage i.e. $\Delta$Mu_stored=$(1-X)$*Mu_inj_rate*$\Delta t$−(Mu_stored/Tau_rel)*$\Delta t$ where $\Delta t$ is a short time interval over which the change in stored mass of ammonia related compounds is observed. This expression is formed at points 20a and 20b and integrated 14 to obtain the amount of ammonia related compounds stored at any time.

Figure 5:
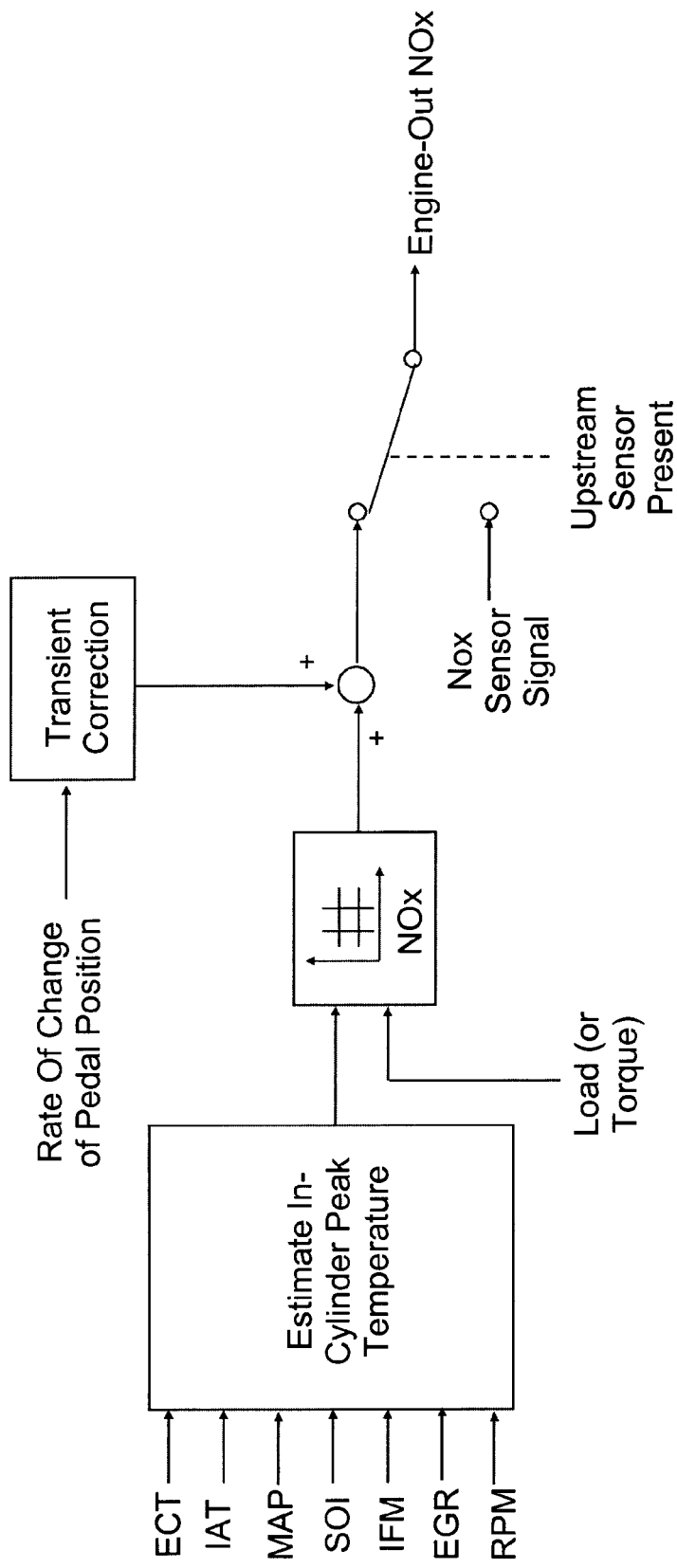
FIG. 5 shows an example model for calculating $NO_x$ emitted from an engine.

The Mnox_rate, or in other words the amount of $NO_x$ needing to be reduced, may be obtained from a model, as shown in FIG. 5. An estimate of in-cylinder peak temperature is obtained from a dynamic model of in-cylinder combustion. This takes into account various factors, which may be at least some of the following: engine coolant temperature (ECT), intake air temperature (IAT), manifold absolute pressure (MAP), start of injection (SOI), injected fuel mass (IFM), exhaust gas recirculation (EGR) and engine speed (RPM), all of which can be obtained from appropriate sensors or maps as is well know. A steady state $NO_x$ emission rate is obtained from a look-up table based on this in-cylinder temperature estimate and the load (or torque) demand on the engine. A correction is then applied to take into account deviations from the steady state due to, for example as shown in FIG. 5, transients caused by acceleration being initiated. The Mnox_rate obtained is fed into the feed-forward system at point 15 shown in FIG. 4.

As can be seen from FIG. 4, the controller combines the different factors as follows: at point 15 the factor "ku" and Mnox_rate are multiplied together. At point 16 1/Tau_rel found from the model of catalyst temperature and for example, from Tau_rel obtained from a look-up table 17 is multiplied with Mu_stored obtained as described above. At point 18 the result from point 16 is subtracted from the result from point 15 and then at point 19 the result from point 18 is multiplied by 1/X to give Mu_inj_rate_opt.

Figure 6:
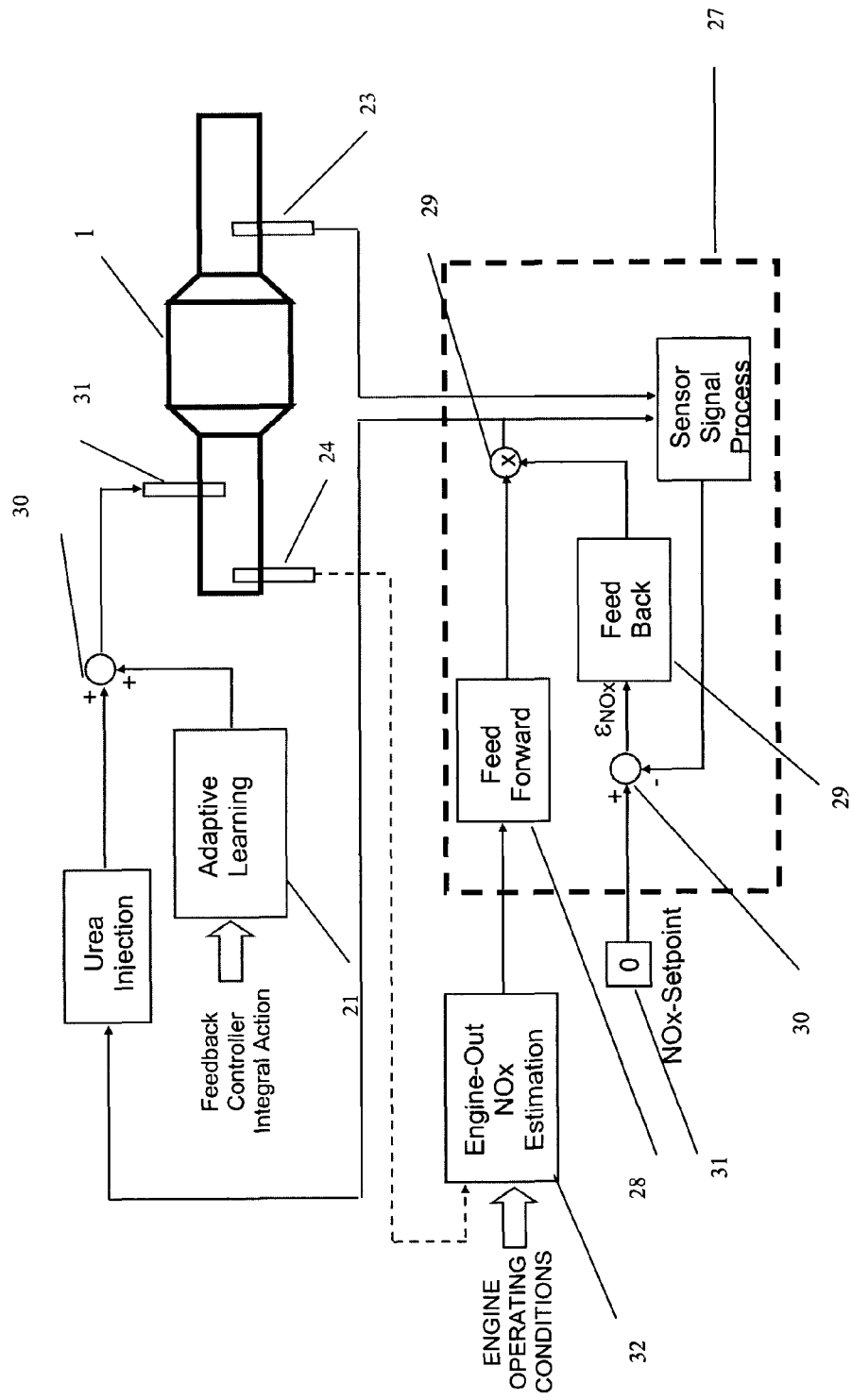
FIG. 6 is a diagrammatic overview of an example system according to the present invention comprising both feed-forward and feedback strategies.

As discussed above, the control system of the present invention may also comprise various feedback mechanisms to remove any errors in the feed-forward strategy. An example system containing two feedback mechanisms is shown in FIG. 6, discussed in more detail below.

Figure 7:
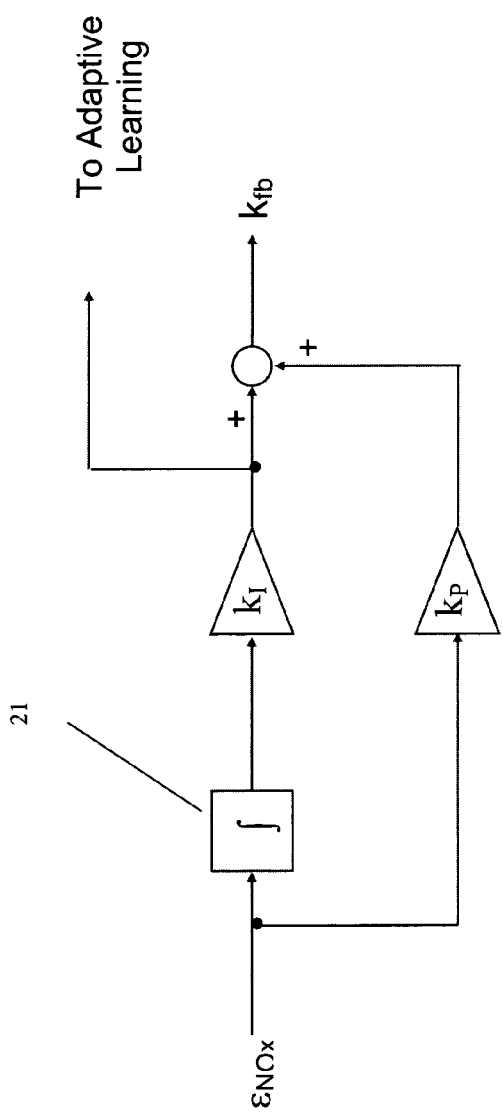
FIG. 7 shows an example first feedback mechanism.
Figure 8:
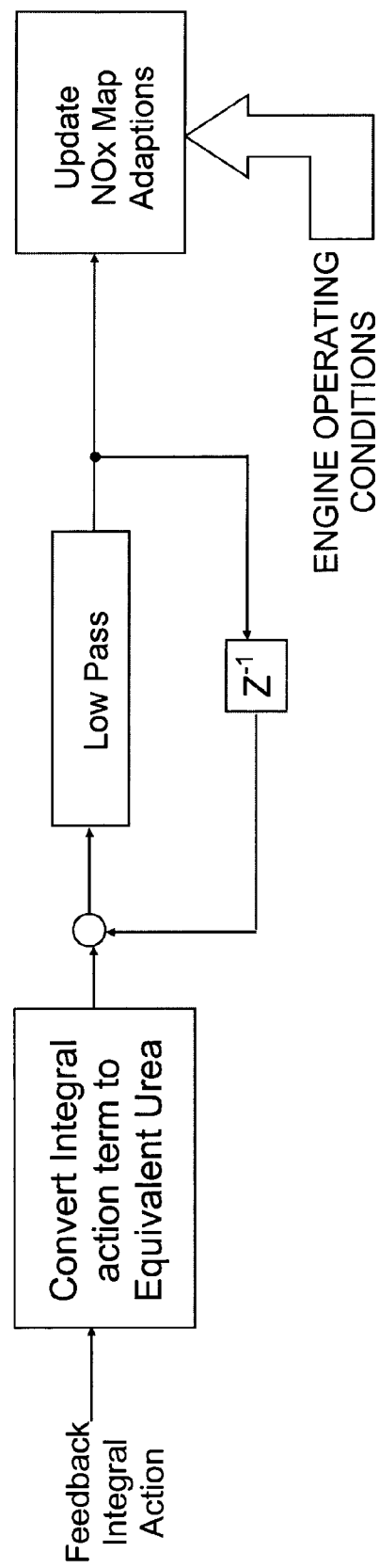
FIG. 8 is a schematic diagram of an adaptive learning module.

One feedback mechanism, shown in FIG. 7, removes any discrepancies between the desired and injected quantity of urea. A simple proportional integral (PI) controller may be used, as shown in the figure. This integrates any error over a period of time at 21 to give $k_I$ and multiplies the error by a constant to give $k_P$. A correction to the urea injection rate, $k_{fb}$, is then calculated by the controller from $k_I + k_P$. $k_I$ may also be output to an adaptive learning module 22, shown in FIG. 6 and outlined in FIG. 8. This adaptive learning module may compensate for any of the following: flow tolerance of the urea injector, build-up of deposits, and changes in the quality of urea. The effect of urea injector flow tolerance (higher or lower flow at a given drive signal), or effects of ageing on certain system components (e.g. build up of deposits on the urea injector nozzle) will result in a lower or higher reading (offset from the nominal value) by the NOx sensor signal. The integral part (I term) of the PI closed-loop controller is effective in eliminating offsets in the sensor output signal—hence the value of the I term is used to "recalibrate" the model as an adaptive term. When the system is operating correctly then the I term should reduce to zero.

Figure 9:
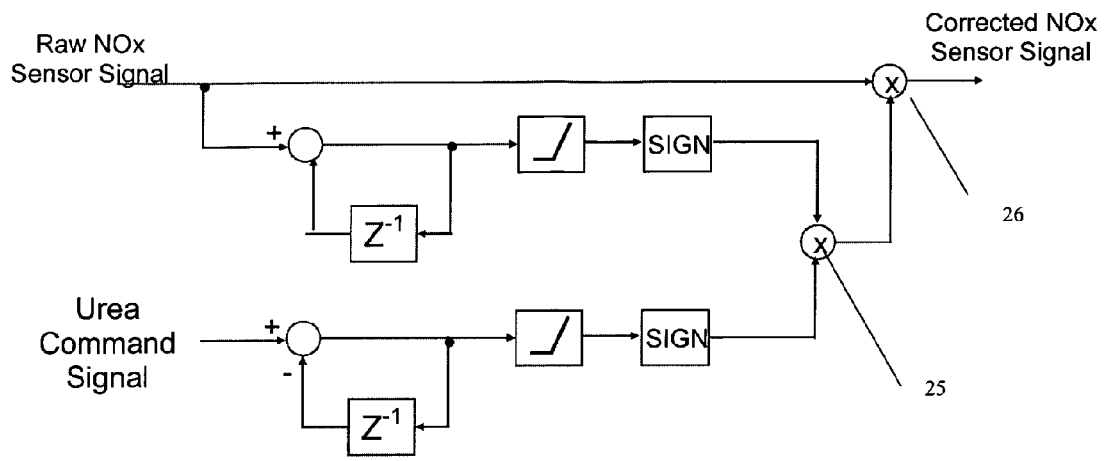
FIG. 9 shows an example second feedback mechanism.

A second feedback mechanism is shown in FIG. 9. A downstream $NO_x$ sensor 23 and possibly also an upstream sensor 24 sense $NO_x$ to adjust for discrepancies between the desired and actual amount of emitted $NO_x$. The desired amount of emitted $NO_x$ is usually zero, as shown in FIG. 6, but may be non-zero in the situation described below where $NO_x$ engine emission is allowed to increase to prevent ammonia slip.

Figure 10:
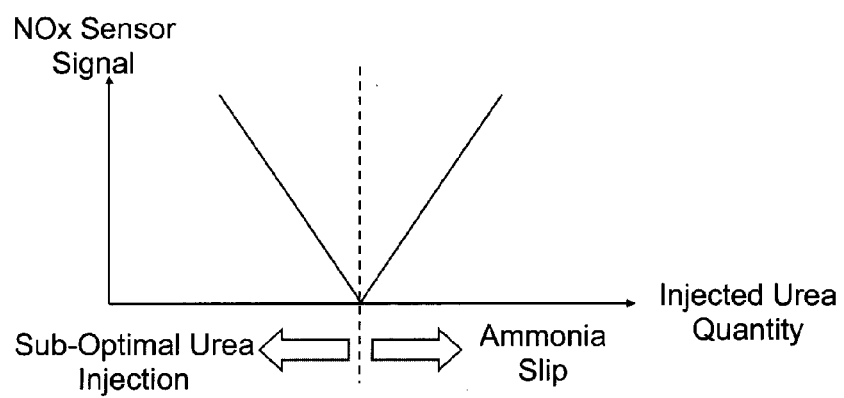
FIG. 10 shows the signals obtained by a $NO_x$ from $NO_x$ and $NH_3$.

Current $NO_x$ sensor technology cannot differentiate between $NO_x$ and $NH_3$, as shown in FIG. 10. Therefore in order to use such a sensor in a feedback control loop, the strategy must be capable of differentiating between $NO_x$ and $NH_3$. This may be done by exploiting the different polarities of the signals as shown in FIG. 10 and estimating the derivative d(Sensor_signal)/d(Mu_inj_rate) based on actual measured values. The polarity of the derivative, calculated at point 25, is used to correct the sensor signal at point 26.

Alternatively, the $NO_x$ sensor signal direction may be used to determine if the model is over or under predicting in a different manner. For example, if the $NO_x$ sensor is reading higher than the model predicts there could be two possible reasons, either there is $NO_x$ slip or $NH_3$ slip because the sensor measures both $NO_x$ and $NH_3$. Understanding if the slip is $NO_x$ or $NH_3$ may be determined by increasing the urea injection, so that if the slip is $NO_x$ then the $NO_x$ sensor signal reduces but if the slip is $NH_3$ then the $NO_x$ sensor signal increases. The converse also holds if the urea injection is reduced—the $NO_x$ sensor signal increases if the slip is $NO_x$ and if the slip is $NH_3$ then the $NO_x$ sensor signal decreases. The sensor is able in this way to correct the model up or down depending on if the error is due to high $NO_x$ or high $NH_3$.

A further way in which the $NO_x$ sensor can be used to correct the SCR model is by looking at the SCR catalyst conversion efficiency. The SCR catalyst conversion efficiency is in part a function of the $NH_3$ storage level and will become suboptimal at either very low $NH_3$ storage levels or very high NH$_3$ storage levels, as a function of the maximum storage capacity at the given operating conditions of the SCR catalyst. This information can be used to correct the model and hence the urea dosing level and achieve an improved conversion efficiency.

A yet further method of correcting the SCR model by the NO$_x$ sensor is as follows. The urea injection can be stopped until the stored NH$_3$ is fully used up. This will have the effect of causing a NO$_x$ breakthrough at the tailpipe which can be measured by the NO$_x$ sensor. The point of breakthrough can be used to zero the NH$_3$ storage level of the SCR model and correct for errors.

The system shown in FIG. 6 comprises a controller 27 which comprises a feed-forward module 28 as shown in FIG. 4. An estimate of engine NO$_x$ emission is input 32 into the feed-forward module 28. This may be an estimate obtained as shown in FIG. 5 or may be obtained from a second NO$_x$ sensor 24. At point 29 the output of the feed-forward module 28, Mu_inj_rate_opt, is combined with the output of a feedback module 29 shown in FIG. 9. This feedback module 29 has an input at point 30 of NO$_x$ levels in the exhaust 5 from the NO$_x$ sensor 23. A second input at point 30 is an NO$_x$ setpoint 31 of the desired NO$_x$ level in the exhaust 5. The value at point 29 may give the urea injection rate or this value may be further corrected at point 30 in accordance with the feedback mechanism and adaptive learning discussed in relation to FIGS. 7 and 8. A urea injector 31 is then controlled to produce a urea injection rate according to the value at point 31. The sensor 23 then senses the resultant NO$_x$ exhaust emission and feeds back this information into the feedback module 29 as discussed above.

The present invention further preferably controls the state of fill of the catalyst, Mu_stored. The main purpose of this aspect of control is to maintain the Mu_stored at a pre-determined target level to provide a buffer for deviations in the rate of production of NO$_x$ by the engine and the rate of NH$_3$ production in the catalyst from the estimates provided by the models. The aim is to ensure that any imbalance in the NO$_x$ and NH$_3$ rates does not result in NO$_x$ emission.

This control may include, under certain conditions, increasing the NO$_x$ produced by the engine, for example for load increases where the exhaust temperature is predicted to increase. If it is predicted that ammonia will be generated at a higher rate than the estimated rate of NO$_x$ emission, increased NO$_x$ emission from the engine mops up the ammonia to avoid ammonia slip. In this way both NO$_x$ and NH$_3$ emission into the atmosphere are minimised.

This control uses EGR to control emission of NO$_x$ from the engine and exhaust gas temperature. As discussed already, these factors influence catalyst temperature, catalyst storage capacity and optimum liquid injection rate. By a combination of the above effects, Mu_stored is controlled to a target level. This also improves fuel economy as the engine is allowed to run at higher thermal efficiency conditions to increase the NO$_x$ emitted by the engine.

This strategy anticipates an acceleration to follow during a deceleration. Instead of reducing the rate of urea dosing under such conditions, as would be conventionally expected, the amount injected is increased, corresponding to the increased storage capacity as the estimated catalyst temperature reduces. When operating under nominal "steady state" conditions, EGR is increased when the stored mass of ammonia related compounds begins to approach a target value. This reduces exhaust gas temperature which in turn cools the catalyst and hence increases the storage capacity for urea. The rate of urea injection is then increased to the new temperature defined capacity.

Conversely, when a condition where engine-out NO$_x$ would be far less than the NH$_3$ released by the catalyst (typically this will happen when catalyst temperature is gradually rising while engine load is reducing—it is a transient phenomenon), the EGR is reduced until the NO$_x$ level is increased to a level sufficient to react with the extra NH$_3$.

The present invention may be used with any internal combustion engine which runs with a predominantly lean fuel/air mixture. For example this may be a diesel engine or a direct injection petrol engine and may be a two-stroke or a four-stroke engine or any other engine type. The engine may be a non-vehicle engine. The SCR catalyst may be a conventional SCR catalyst and may be, for example, made from metallic or ceramic substrate (typically titania or zeolite) coated with catalytic material (typically iron, vanadium or copper). The liquid injector is a conventional liquid injector.

Although an aqueous urea solution has been discussed above as being injected, the injected liquid may be any other suitable liquid containing an ammonia generating compound. The controller may be implemented in hardware or software and may be, for example, an engine control unit (ECU). The look-up tables may be any conventional look-up tables. For example, the tables may be obtained from test calibration runs of the engine. Any sensors, such as a temperature sensor, may be conventional sensors.

The present invention represents a significant improvement over state of the art vehicle SCR systems as the detailed modelling of the variation of catalyst behaviour with temperature in terms of the catalyst's ability to store and release ammonia generating compounds means that the levels of ammonia can be far more accurately matched with the levels of NO$_x$ at the catalyst. Ammonia slip can therefore be minimised at the same time as maximising NO$_x$ reduction. A conventional NO$_x$ sensor may be used in order to provide feedback to the system of the present invention by distinguishing a sensor signal due to NO$_x$ from a sensor signal due to NH$_3$ by exploiting the different polarity of the sensor signal in each case.

The invention claimed is:

1. An apparatus comprising a controller configured to control the rate of an introduction component for providing a NO$_x$ reducing precursor to a catalyst component, the controller:
    obtaining an amount of NO$_x$ entering the catalyst component from a NO$_x$ sensor,
    modeling an amount of NO$_x$ reducing substance or precursor in the catalytic component to react with the NO$_x$ obtained by the NO$_x$ sensor, and
    controlling the rate of the introduction component to produce NO$_x$ reducing substance or precursor to reduce NO$_x$,
    wherein an optimum NO$_x$ reducing precursor introduction rate, Mu_inj_rate_opt, satisfies the relation:

$$\text{Mu\_inj\_rate\_opt} = (ku \cdot \text{Mnox\_rate} - \text{Mu\_stored}/\text{Tau\_rel})/X$$

wherein ku is the amount of NO$_x$ reducing substance required to reduce one mole of NO$_x$;
    Mu_stored is the mass of NO$_x$ reducing precursor stored in the catalyst;
    Tau_rel is a time constant for the rate of NO$_x$ reducing precursor release from the catalyst; and
    Mnox_rate is the mass flow rate of NO$_x$ emission entering the catalyst component, and X is the fraction of introduced NO$_x$ reducing precursor that immediately decomposes into NH$_3$.

2. The apparatus as claimed in claim 1 further comprising a catalyst component.

3. An engine comprising an apparatus as claimed in claim 2.

4. A method of controlling a rate of introduction of a $NO_x$ reducing precursor to a catalyst component, comprising:
obtaining the amount of $NO_x$ entering the catalyst component without monitoring the amount of $NO_x$ leaving the catalyst component, modeling the amount of $NO_x$ reducing substance or precursor in the catalyst component and controlling the rate of introduction of the $NO_x$ reducing precursor to reduce $NO_x$,
wherein the step of modeling the amount of $NO_x$ reducing substance or precursor further comprises:
modeling the amount of introduced $NO_x$ reducing precursor converted into $NO_x$ reducing substance dependent on a catalyst component temperature;
modeling the amount of $NO_x$ reducing precursor stored in the catalyst component dependent on the catalyst component temperature; and
modeling the amount of stored $NO_x$ reducing precursor released dependent on the catalyst component temperature;
wherein an optimum $NO_x$ reducing precursor introduction rate, Mu_inj_rate_opt, satisfies the relation:

$$\text{Mu\_inj\_rate\_opt} = (ku \cdot \text{Mnox\_rate} - \text{Mu\_stored}/\text{Tau\_rel})/X$$

wherein ku is the amount of $NO_x$ reducing substance required to reduce one mole of $NO_x$;
Mu_stored is the mass of $NO_x$ reducing precursor stored in the catalyst;
Tau_rel is a time constant for the rate of $NO_x$ reducing precursor release from the catalyst; and
Mnox_rate is the mass flow rate of $NO_x$ emission entering the catalyst component and X is the fraction of introduced $NO_x$ reducing precursor that immediately decomposes into $NH_3$.

5. The method as claimed in claim 4 wherein the rate of introduction is controlled such that the $NO_x$ entering the catalyst component is reduced by the $NO_x$ reducing substance.

6. The method as claimed in claim 4 in which the rate of introduction is controlled such that substantially all of the $NO_x$ reducing substance is used up in the catalyst component.

7. The method as claimed in claim 4 further comprising the step of controlling the amount of $NO_x$ entering the catalyst component to use up substantially all of the $NO_x$ reducing substance in the catalyst component.

8. The method as claimed in claim 7 wherein the amount of $NO_x$ entering the catalyst component is controlled by varying exhaust gas recirculation.

9. The method as claimed in claim 4 in which the amount of $NO_x$ entering the catalyst component is obtained from a model based on a measure of the exhaust temperature entering the catalyst component from an engine, and engine load.

10. The method as claimed in claim 9 in which the amount of $NO_x$ entering the catalyst component is stored in a look up table as a function of temperature and load.

11. The method as claimed in claim 10 in which the temperature comprises engine in-cylinder peak temperature derived from at least one of engine coolant temperature, intake air temperature, manifold pressure, start of injection, injected fuel mass, exhaust gas recirculation and engine speed.

12. The method as claimed in claim 9 in which the amount of $NO_x$ entering the catalyst component is further modeled dependent on correction for transient operation.

13. The method as claimed in claim 4 in which the amount of $NO_x$ entering the catalyst component is obtained from a sensor.

14. The method as claimed in claim 4 further comprising modeling the catalyst component temperature based on a measure of the temperature of exhaust entering the catalyst component.

15. The method as claimed in claim 4 in which the rate of introduction is further controlled to maintain the amount of $NO_x$ reducing precursor stored in the catalyst component above a buffer threshold.

16. The method as claimed in claim 4 in which the $NO_x$ reducing substance comprises ammonia and the $NO_x$ reducing precursor comprises urea.

17. The method as claimed in claim 4 in which the catalyst component comprises a selective catalytic reduction component.

18. The method as claimed in claim 4, wherein the precursor comprises urea and/or one or more intermediate ammonia related compounds.

* * * * *